E. B. MERRIAM.
ELECTRIC SWITCH.
APPLICATION FILED JUNE 23, 1911.
1,222,439.
Patented Apr. 10, 1917.
4 SHEETS—SHEET 1.
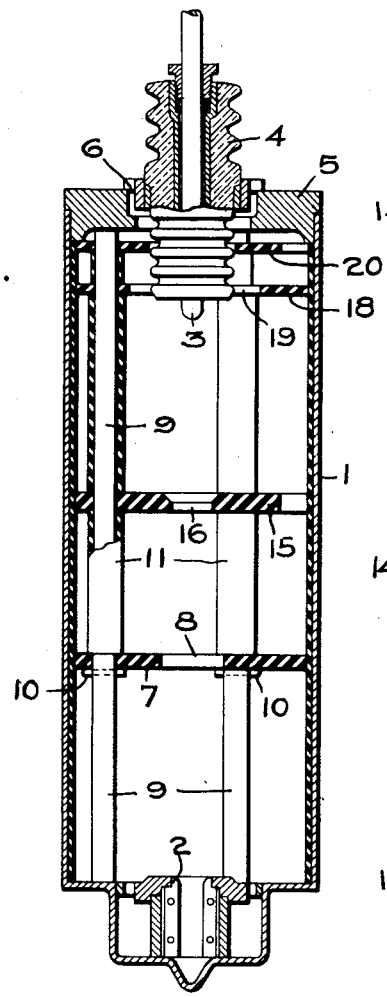
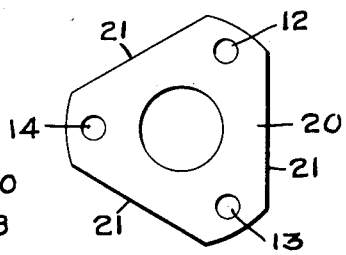
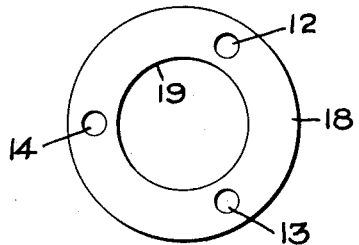
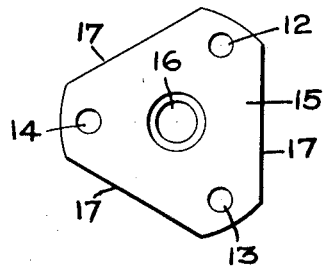
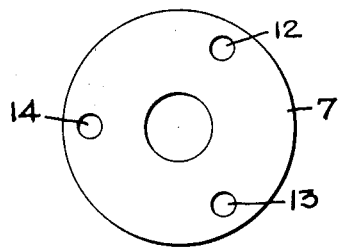
Witnesses
Marcus L. Byng.
J. Ellis Glen
Inventor.
Ezra B. Merriam
by Allen H. Davis
His Attorney

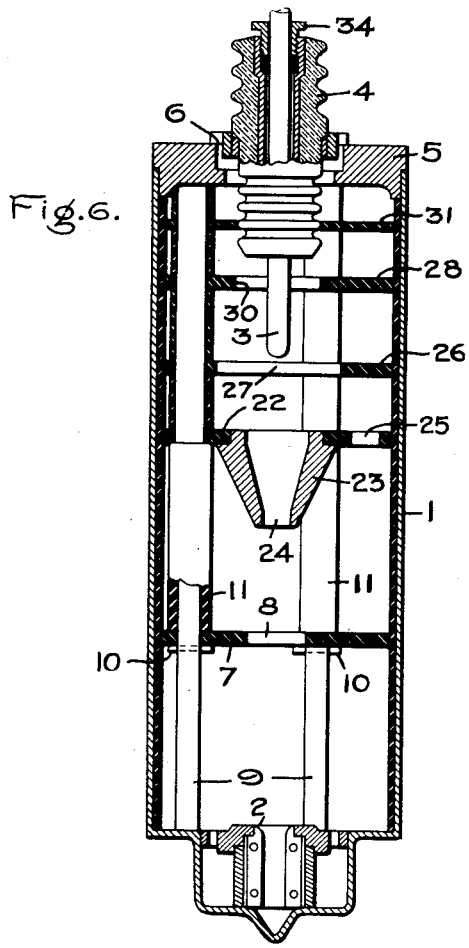
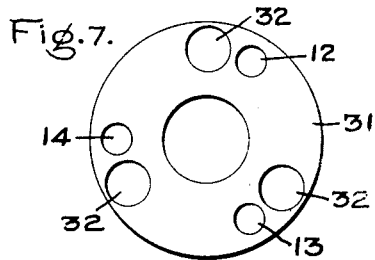
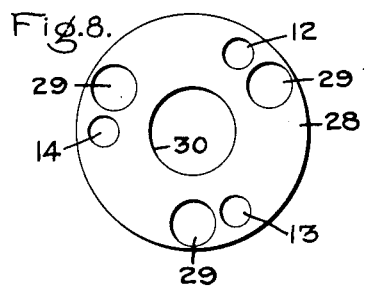
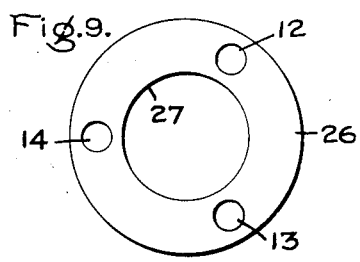
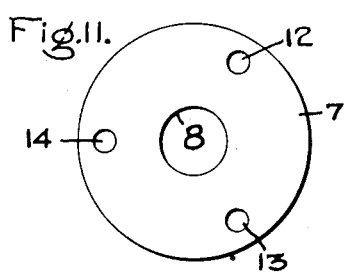
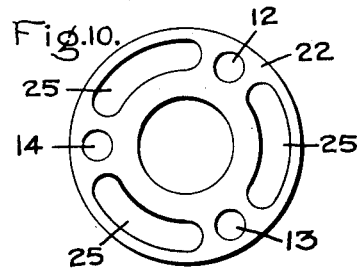

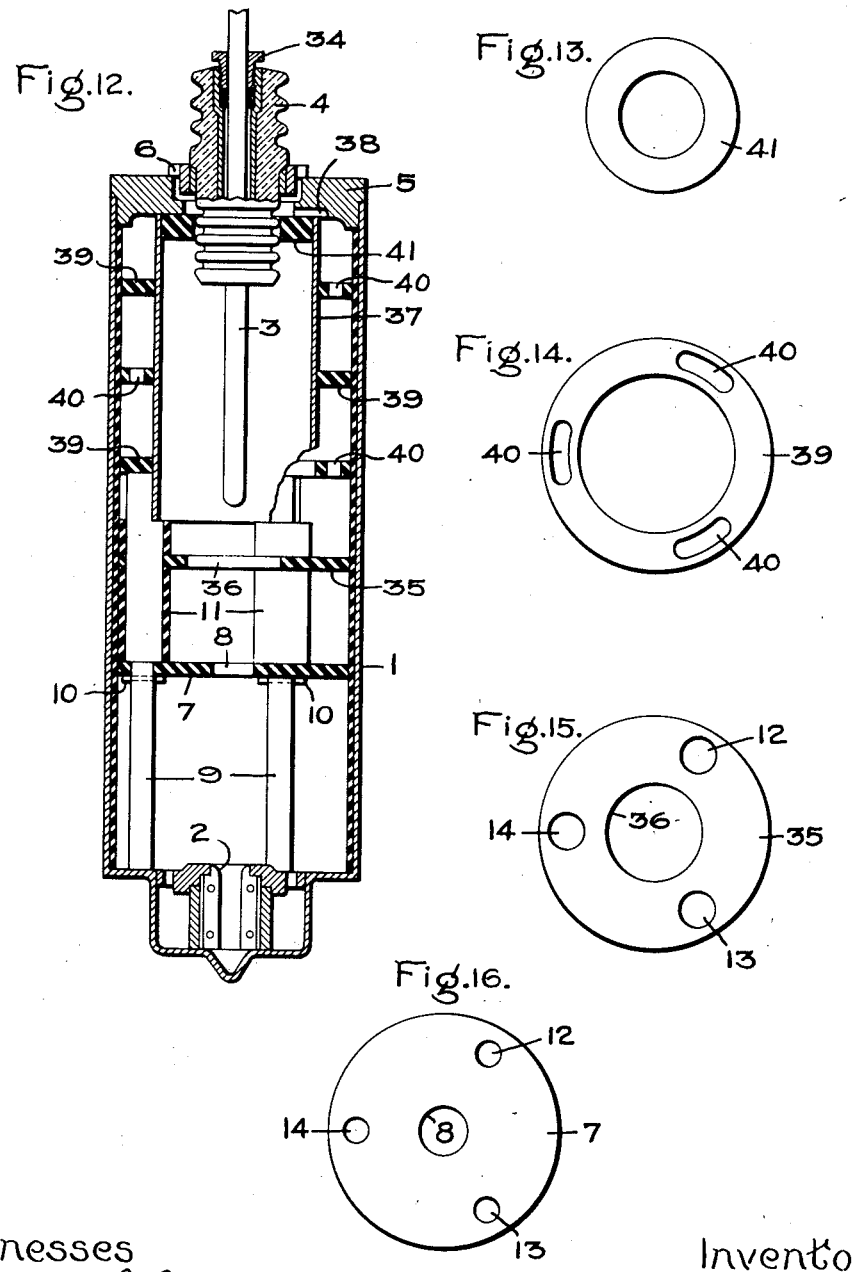

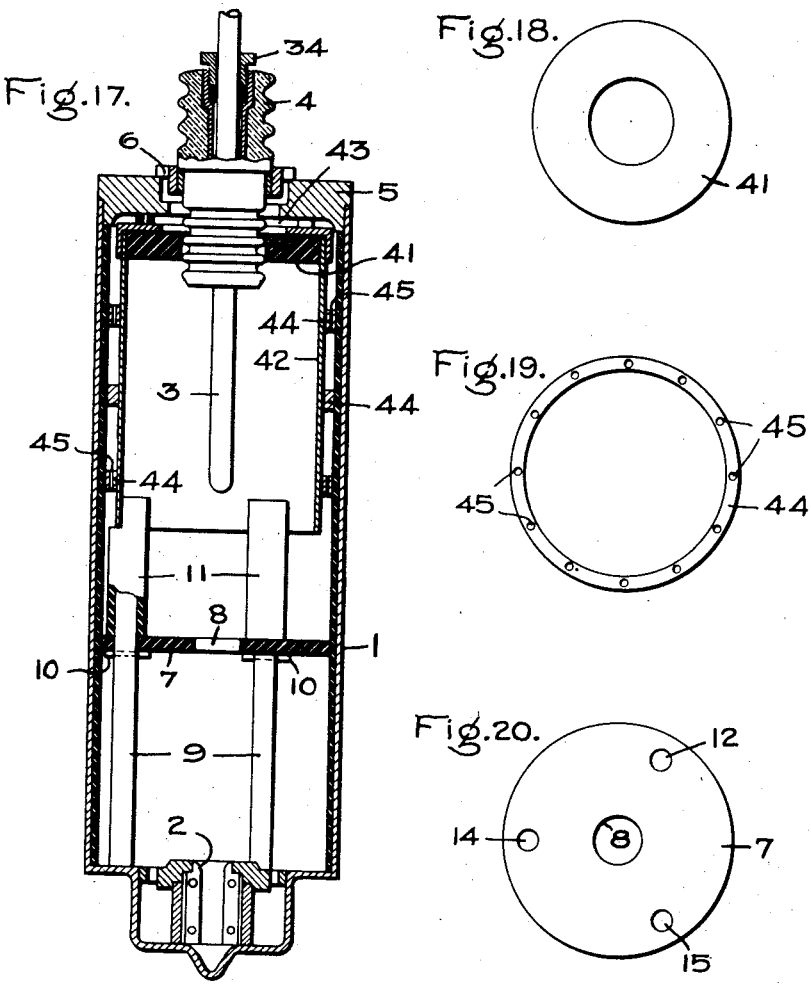

UNITED STATES PATENT OFFICE.

EZRA B. MERRIAM, OF SCHENECTADY, NEW YORK, ASSIGNOR TO GENERAL ELECTRIC COMPANY, A CORPORATION OF NEW YORK.

ELECTRIC SWITCH.

1,222,439.

Specification of Letters Patent.　　Patented Apr. 10, 1917.

Application filed June 23, 1911.　Serial No. 634,950.

*To all whom it may concern:*

Be it known that I, EZRA B. MERRIAM, a citizen of the United States, residing at Schenectady, county of Schenectady, State of New York, have invented certain new and useful Improvements in Electric Switches, of which the following is a specification.

My invention relates to electric switches, particularly switches in which the circuit is opened in oil or some other suitable insulating fluid, and its object is to provide an efficient and reliable switch of this character in which throwing of oil from the oil vessel during the opening of the circuit is prevented; in which the tendency of the oil put under pressure by the arc to follow the moving contact and thereby escape from the oil vessel along the moving contact, is overcome; in which the oil or insulating fluid put under pressure and set in motion by the action of the arc, is caught and its motion checked before it can escape from the oil vessel, preferably by causing the oil to flow in a definite and predetermined direction and then deflecting it through a tortuous path and baffling it in such a manner that it loses its velocity before reaching the vents to the atmosphere; in which the gases and vapors put under pressure in the oil vessel by the opening of the circuit may escape freely to the atmosphere before the oil, set in motion by the pressure generated by the arc, reaches the vents through which the air and gases escape; whereby sealing up of the vents by the oil prior to the escape of air and gases put under pressure in the oil vessel is prevented; in which the fluids put under pressure in the oil vessel are cooled before they escape from the oil vessel; and which in many details hereinafter more fully set forth is an improvement over the switches heretofore used.

My invention will best be understood in connection with the accompanying drawings in which, merely for purposes of illustration, I have shown some of the various forms in which my invention may be embodied and in which Figure 1 is a cylindrical section of one form of switch constructed in accordance with my invention; Figs. 2, 3, 4 and 5 are plan views of portions of the switch shown in Fig. 1; Fig. 6 is a longitudinal section of a similar form of switch embodying my invention in a modified form; Figs. 7, 8, 9, 10 and 11 are plan views of details of the switch shown in Fig. 6; Fig. 12 is a longitudinal section of a similar form of oil switch showing another embodiment of my invention; Figs. 13, 14, 15 and 16 are plan views of parts of the switch shown in Fig. 12; Fig. 17 is a longitudinal section of a similar form of switch embodying still another form of my invention; and Figs. 18, 19 and 20 are plan views of parts of the switch shown in Fig. 17.

For purposes of illustration, the various forms of my invention shown in the drawings are shown as embodied in an electric switch of the same general type and for convenience the corresponding parts of the switch in the different figures are marked with the same reference characters.

The particular form of switch in which I have shown my invention embodied, comprises an oil pot 1 made of metal, lined with insulation, and containing oil or other suitable insulating fluid in which the circuit is opened. The circuit is controlled by means of two relatively movable coöperating contacts, such as a stationary contact 2 mounted in the bottom of the oil pot 1 and a movable contact 3 in the form of a rod moved longitudinally of the oil pot 1 by any suitable actuating mechanism and slidably mounted in a hollow insulator 4 carried by the top 5 of the oil pot. The top 5 makes the oil pot a substantially closed vessel. The separation of the contacts draws an arc in the insulating fluid, and the pressure produced by the arc is relieved by means of suitable vents, such as the vents 6 in the top 5 of the oil pot. The insulating fluid is retained in the neighborhood of the arc and is directed against the arc to extinguish it by means of a perforated wall or partition 7 provided with a vent 8 and mounted above the stationary contact 2 with its edges in engagement with the walls of the lining of the oil pot 1, so that the stationary contact 2 is inclosed in a pressure retaining chamber or vessel of which the partition 7 forms one wall, and in which the oil is put under pressure by the action of the arc formed between the contacts as the circuit is being opened.

The wall or partition 7 is held in place against the pressure generated by the arc in the pressure retaining chamber by suitable supports, such as the insulating supports 9, preferably made in the form of rods with one end resting on the bottom of the oil pot. The partition 7 is prevented from dropping to the bottom of the oil pot by means of cross pins 10 extending through the supports 9 below the partition, and movement of the partition toward the top of the pot under the pressure developed by the arc is prevented by means of shoulders formed, in the specific arrangement shown in the drawings, by insulating sleeves 11 on the insulating rods 9.

When a switch constructed as above described is opened, the movable contact 3 separates from the stationary contact and moves upward through the vent 8 of the partition 7, thereby drawing an arc through the vent if the potential of the circuit is sufficiently high. The partition 7 confines in the pressure retaining chamber, the oil put under pressure by the arc, and directs it through the vent 8 against the arc to extinguish it, with the result that oil and gases are projected through the vent 8 in a more or less well defined jet or stream which tends to spread out like a jet of a fountain but which may move with a velocity high enough to cause it to follow the movable contact 3 and to escape through the hollow insulator 4 and through the vents 6.

In accordance with my invention the jet of oil projected from the pressure retaining chamber is intercepted and baffled and the rapidly moving oil is directed toward the sides of the oil pot and compelled to follow such a tortuous path that by the time it reaches the vents 6 the air and gases under pressure have escaped and its velocity is so low that it will not pass out through the vents. In the particular embodiments of the invention shown the means for intercepting and baffling the jet of oil from the pressure retaining chamber comprises baffle plates or deflectors placed in a position to intercept and deflect the jet of oil from the vent 8, and held in place on the insulating supports 9, which extend through holes 12, 13 and 14 in the partition 7 and through corresponding holes in the various baffles and diverting wings. For convenience the corresponding holes in the partition 7 and in all the baffles are marked with the same reference characters in order that the relation of the parts may be apparent.

In the specific arrangement shown in Fig. 1 the jet of fluid issuing from the pressure retaining chamber first impinges upon a deflecting baffle or interceptor 15 provided with a central opening 16 through which the movable contact 3 passes with very slight clearance and which is cut away at the edges at the portions marked 17 to leave passages for the oil between the edges of the baffle and the walls of the oil pot. As the switch is opening the major portion of the fluid ejected through the vent 8 strikes upon and is deflected by the deflecting baffle 15 and can reach the upper part of the oil pot only by flowing through the openings between the edge of the deflecting baffle and the walls of the oil pot. The deflecting baffle is mounted in the space between the vent 8 and the top of the oil vessel, nearer the vent than the top of the vessel and preferably at approximately one-third the distance between the vent and the top of the vessel. The currents of oil flowing upward along the walls of the oil pot are then thrown toward the center of the oil pot by impinging upon a diverting baffle 18 mounted near the upper part of the oil pot with its edge in engagement with the walls of the oil pot and provided with a comparatively large central opening 19 concentric with the movable contact 3 and hollow insulator 4. Any oil which moves at a velocity high enough to pass through the opening 19 of the diverting baffle 18 is thrown outward toward the edge of the pot by the second deflecting baffle 20, which fits snugly around the insulator 4 and is also cut away on the edges at 21 similar to the baffle 15, so that the oil deflected by it can reach the vents 6 only by flowing upward along the walls of the oil pot and over the edges of the baffle and then inward toward the vents.

In the switch described the pressure in the oil pot is quickly relieved and at the same time the oil is not thrown from the oil pot because the air and gases under pressure are more mobile and move more rapidly than the oil and therefore discharge with comparative freedom through the openings in the various baffles and the vents 6 to the atmosphere before the oil can reach the vents, while the greater portion of the oil discharged from the vent 8 of the pressure retaining chamber can reach the vents 6 to the atmosphere only by following a tortuous path in which it is constantly losing velocity owing to the continual changes in direction of flow, the consequent friction and the eddies set up in the oil.

The switch shown in Fig. 6 is in general constructed in the same way as the switch shown in Fig. 1, but in this particular form of switch a deflecting baffle 22, mounted in a similar manner as baffle 15 to intercept and deflect the greater portion of the jet of oil delivered from the vent 8 of the pressure retaining chamber, is provided with a deflecting cone 23 having a central opening 24 just large enough for the movable contact 3 to pass through with very slight clearance, and is mounted with its small end in alinement with the vent 8 of the pressure retaining chamber. The edge of the deflecting baffle engages the walls of the oil pot and this baffle is provided with openings 25 near its edge. The deflecting cone 23 diverts and deflects to the walls of the oil pot all of the fluid discharged from the vent 8 except a small amount which tends to follow the contact rod through a small central opening in the deflecting cone.

Oil which flows through the openings 25 of the deflecting baffle 22 is diverted and its direction of flow is changed toward the center of the oil pot by a diverting baffle 26 having a comparatively large central opening 27 and mounted with its edges in engagement with the walls of the oil pot, so that its solid portion is in alinement with the openings 25 of the baffle 22.

The velocity of oil coming through the baffles 22 and 26 is still further reduced by mounting above the diverting baffle 26 an intercepting baffle 28 having a number of openings 29 near the edge and a central opening 30 concentric with the movable contact 3 and smaller than the central opening 27 of the diverting baffle 26. Above the intercepting baffle 28 is mounted a second intercepting baffle 31 which fits quite closely around the insulator 4 and which is provided with openings 32 out of alinement with the openings 29 of the baffle 28. Oil can go through the intercepting baffles 28 and 31 only by a tortuous path through the staggered openings of the intercepting baffles.

As the switch opens the contacts separate and the arc drawn in the pressure retaining chamber puts the oil in the chamber under pressure. As the movable contact passes out of the retaining chamber through the vent 8 the arc follows and the oil put under pressure by the arc is directed against it to extinguish it, with the result that a jet of fluid issues from the vent 8 and tends to follow and move with the contact 3. As the jet rises it tends to spray out like a jet of a fountain and the greater portion of it is caught and deflected by the deflecting cone 23. The oil which is deflected moves with considerable velocity toward the wall of the oil pot and then flowing through the openings 25 impinges upon the solid portion of the diverting baffle 26 and is thrown toward the center of the oil pot. In its upward flow it then encounters the intercepting baffle 28 and most of it is compelled to flow through the openings 29, whereupon it strikes the solid portion of the intercepting baffle 31 and is deflected changing its direction to reach the openings 32 of the second intercepting baffle 31. All this time the numerous changes in the direction of flow and the eddies and friction have so reduced the velocity of the moving oil that very little will reach the vents 6. While this action is going on any fluid projected through the opening 24 of the deflector cone is sprayed out like a jet of a fountain and is caught and deflected by the various baffles above the deflecting baffle 22, so that none of the oil follows the movable contact 3 with sufficient velocity to be thrown from the oil vessel.

Any small amount of oil which may possibly be directed along the surface of the movable contact is intercepted by a stuffing box 34 mounted in the insulator 4 to make a fluid tight joint between the movable contact and the insulator.

In the form of switch shown in Fig. 12 the jet of fluid discharged from the pressure retaining chamber is caught in a chamber which stops the flow of oil without undue shock to the switch and from which the gases and air put under pressure may escape freely before the oil trapped in said chamber can reach the vents through which the air and gases escape. In the particular form of switch shown in Fig. 12 a diverting baffle 35 having a comparatively large central opening 36 is mounted above the partition 7 and concentric with the path of movement of the contact 3. The parts are so proportioned that a considerable part of the jet of fluid from the vent 8 to the pressure retaining chamber is caught and deflected toward the walls of the oil pot by the baffle 35.

To intercept the jet of fluid which passes through the baffle 35 and to permit the gases under pressure to escape before the vents are sealed by the oil I provide a trap chamber 37 mounted above the baffle 35 and in alinement with the vent of the pressure retaining chamber. The trap chamber is closed at the upper end and is mounted in the oil pot 1 with its lower open end at about the surface of the oil in the oil pot. The lower end of the trap chamber may be either above or below the oil level, but in most cases is preferably above it. The movable contact 3 passes through the trap chamber 37 and makes a substantially air tight joint with the upper end of the trap chamber by means of the stuffing box 34. Air or gases trapped in the chamber and put under pressure cannot escape along the movable contact 3 but must escape around the lower edges of the trap chamber.

The annular space between the trap chamber 37 and the walls of the oil pot is vented to the atmosphere through vents 38 and in order to prevent oil being projected through this annular space and thence through the vents to the outside of the oil pot I mount intercepting baffles 39 between the cushioning chamber and the walls of the oil pot. These intercepting baffles are provided with openings 40, and the baffles are so positioned with relation to each other that the openings 40 are out of alinement, consequently any fluid passing from the lower edge of the trap chamber to the vent 6 must follow a tortuous path through the intercepting baffles.

In the particular form of switch shown, the closed end of the trap chamber 37 is formed of an insulating washer 41 which fits snugly the walls of the cushioning chamber and makes a tight joint with the outer walls of the hollow insulator 4.

As the switch opens and the jet of fluid issues from the pressure retaining chamber a portion of it is caught and deflected by the deflecting baffle 35. The greater portion proceeds upward in the form of a jet into the trap chamber 37. The jet of fluid projected into the trap chamber leaves around the edges of the open end of the trap chamber a comparatively free passage through which the air and gases under pressure flow out around the edge of the trap chamber and thence through the intercepting baffles 39 with comparatively little obstruction. The holes 40 in the baffles 39 form a tortuous path in which most of the velocity of the moving oil is lost before the oil reaches the vents 6.

The particular form of switch shown in Fig. 17 has a trap chamber 42 very similar to the trap chamber 37 of the switch shown in Fig. 12. The annular space between the trap chamber 42 and the walls of the oil pot is vented to the atmosphere through passages and vents 43, and the flow of oil through the annular space is hindered by a number of metallic obstructing baffles 44 annular in form and of a width sufficient to extend across the space between the inner wall of the oil pot 1 and the outer wall of the trap chamber 42. These metallic obstructing baffles are provided with a number of openings 45 and the baffles are so positioned with relation to one another that the openings are out of alinement.

As the circuit is opened the air and gases put under pressure in the oil pot 1 escape with comparative freedom through the obstructing baffles 44 and during their escape are very considerably cooled by contact with the metal of the baffles so that by the time the gases escape through the vents 43 their temperature is so low that they are not conductive and they will not easily ignite when in contact with the atmosphere. As the oil attempts to follow the air and the gases through the baffles 44 its velocity is decreased by the tortuous path which it is compelled to follow and owing to the friction and eddies the velocity of the oil is reduced to such an extent that very little of it will escape from the vents in the top of the oil pot.

My invention may be embodied in many other forms than those shown and described and I therefore do not desire to restrict myself to the precise arrangements herein disclosed except in so far as they are limited by the scope of the appended claims.

What I claim as new, and desire to secure by Letters Patent of the United States, is:—

1. A circuit interrupting device comprising a vessel, a pressure retaining chamber containing oil and having a vent in one wall thereof, current carrying terminals normally in electrical connection in said chamber and separable to break the circuit in said chamber, and deflecting members in the space between said vent and the top of said vessel provided with openings out of alinement for compelling the oil discharged from said vent to flow in a tortuous path.

2. An oil switch comprising a vessel containing oil, relatively movable coöperating contacts mounted to separate in said vessel beneath the oil, a pressure retaining chamber surrounding the point of separation of said contacts and having a vent in one wall thereof through which one of said contacts passes out of said chamber when the switch opens, an oil intercepting chamber closed at one end and mounted in said vessel in alinement with said vent and with its open end adjacent said vent to receive oil discharged from said vent.

3. An oil switch comprising an oil vessel, a pressure retaining chamber in said vessel containing oil and having a vent in the upper wall thereof, relatively movable coöperating contacts mounted to separate in said chamber, an oil intercepting chamber closed at its upper end and mounted in said vessel in alinement with said vent with its open lower end adjacent said vent, one of said contacts being mounted to separate from its coöperating contact in said pressure retaining chamber and to move up out of said pressure retaining chamber through said vent into said oil intercepting chamber as the circuit is opened.

4. An oil switch comprising a substantially closed vessel containing oil and having therein a pressure retaining chamber with a vent in one wall thereof, an oil intercepting chamber closed at one end and mounted in said vessel with its open end adjacent the vent of said pressure retaining chamber to catch the oil ejected from said vent, relatively movable coöperating contacts mounted to separate in said pressure retaining chamber and to draw an arc through said vent into said oil restraining chamber as the circuit is opened, and vents to the atmosphere from the space between said oil restraining chamber and the walls of said vessel.

5. An oil switch comprising a vessel containing oil, relatively movable coöperating contacts mounted to separate in said vessel, immovable means located in said vessel to confine the oil put under pressure by the arc and to direct it against the arc to extinguish it, and plates mounted in said vessel above said immovable means provided with openings adjacent the walls of said vessel and out of alinement with each other for intercepting and baffling the oil directed against the arc to extinguish it.

6. An oil switch comprising a vessel partially filled with oil, relatively movable contacts mounted to separate in said vessel, a perforated partition in said vessel for confining the oil put under pressure by the arc and for directing the oil against the arc to extinguish it, a baffle plate above said partition and a plurality of baffle plates mounted in said vessel above said first mentioned baffle plate and provided with openings adjacent the walls of said vessel, said last mentioned baffle plates being positioned to cause said openings to be out of alinement with one another, whereby the oil directed against the arc is compelled to flow in a tortuous path.

7. An oil switch comprising an oil vessel partially filled with oil, a stationary contact in the bottom of said vessel, a movable contact mounted to move vertically in said vessel into and out of engagement with said stationary contact, means in said chamber above said stationary contact for confining the oil put under pressure by the arc and directing it against the arc to extinguish it, and baffle plates mounted concentric with the path of said movable contact with their edges adjacent the walls of said vessel, said baffle plates having central perforations for the passage of said movable contact and having adjacent their edges openings for the passage of oil, said baffle plates being mounted with said openings for the passage of oil out of alinement.

8. An oil switch comprising a vessel containing oil, relatively movable coöperating contacts mounted to separate in said vessel beneath the oil, and metallic baffles having openings through the middle thereof for the passage of one of said contacts and mounted concentric with the path of movement of one of said contacts and with their edges adjacent the walls of said vessel, said metallic baffles being provided with holes and positioned with relation to one another to cause said holes to be out of alinement.

9. An oil switch comprising an oil vessel partially filled with oil, relatively movable coöperating contacts mounted to separate in said vessel beneath the oil, a plurality of metallic baffles having central openings through the middle thereof and mounted with their edges adjacent the walls of said vessel and with said central openings concentric with the path of movement of one of said contacts, whereby said contact moves through said baffles as the circuit is opened, said baffles having near their edges a plurality of holes and being positioned with relation to one another to cause said holes to be out of alinement whereby fluid passing through said baffles is cooled and is compelled to follow a tortuous path.

10. A circuit controlling device comprising a vessel adapted to contain insulating fluid, and a pressure retaining chamber having an opening in one wall thereof, current carrying means separable in said chamber to produce therein a break in the circuit, and an intercepting member fixed in position within said vessel adjacent said opening and bearing such a relation to said opening that the distance from said vent to said member is approximately one-third the distance from said vent to the top of said vessel.

11. A circuit interrupting device comprising a vessel adapted to contain oil, and a pressure retaining chamber having a vent in one end thereof, a fixed contact in said chamber, a coöperating contact separable from said fixed contact and movable through said vent to break the circuit, an intercepting member fixed in position within said vessel provided with a central opening and with openings adjacent the walls of said vessel, said intercepting member being so positioned that the distance between said vent and said member is one-third the distance between said vent and the top of said vessel in which position the oil and gases ejected from said vent are separated.

12. A circuit interrupting device comprising a vessel adapted to contain oil, and a pressure retaining chamber having a vent in one wall thereof, a fixed contact in said chamber, a coöperating contact separable from said fixed contact within said chamber and movable through said vent to break the circuit, and a stationary intercepting member through which said movable contact passes, said member being immovably positioned adjacent said vent at approximately one-third the distance from said vent to the top of said vessel for separating the oil and gases ejected from said vent.

In witness whereof, I have hereunto set my hand this 22nd day of June, 1911.

EZRA B. MERRIAM.

Witnesses:
BENJAMIN B. HULL,
MARGARET E. WOOLLEY.